Tait & Avis.
Fermenting Apparatus.

Nº 63,116. Patented Mar. 19, 1867.

United States Patent Office.

A. H. TAIT AND JOSEPH W. AVIS, OF NEW YORK, N. Y.

Letters Patent No. 63,116, dated March 19, 1867.

IMPROVED PROCESS AND APPARATUS FOR THE FERMENTATION OF SACCHARINE LIQUIDS.

The Schedule referred to in these Letters Patent and making part of the same.

TO ALL WHOM IT MAY CONCERN:

Be it known that we, A. H. TAIT and JOSEPH W. AVIS, both of No. 63 Pearl street, in the city, county, and State of New York, have invented a new and improved Apparatus for the Vinous Fermentation of Saccharine Solutions; and we do hereby declare that the following is a full, clear, and exact description thereof, which will enable those skilled in the art to make and use the same, reference being had to the accompanying drawing, forming part of this specification, in which—

Similar letters of reference in both views indicate corresponding parts.

Figure 1:
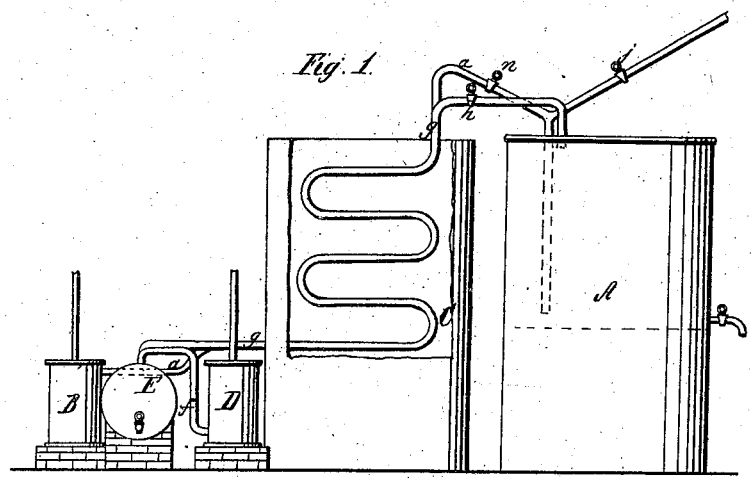
Figure 1 represents a sectional side elevation of this invention.
Figure 2:
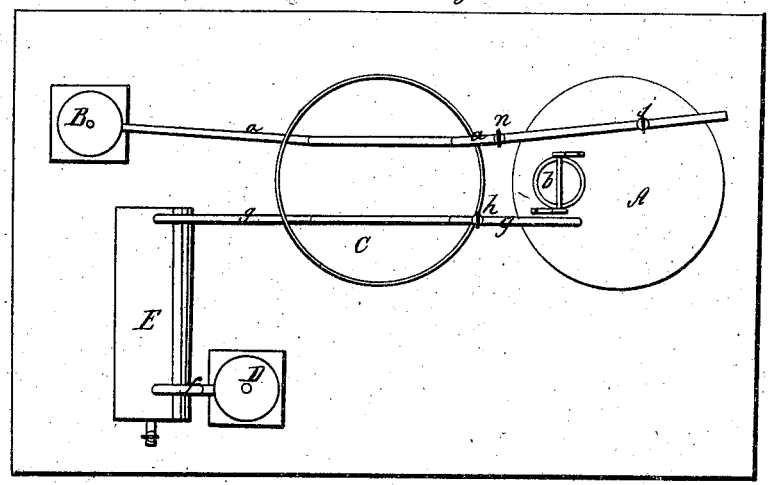
Figure 2 is a plan or top view of the same.

This invention relates to an apparatus in which the vinous fermentation of saccharine solutions is effected *in vacuo*, which is produced by connecting with the fermenting tun an exhaust-pump, or other suitable device which will produce the desired effect. Previous to the application of the exhaust-pump, however, the liquid in the fermenting tun is cooled; and to effect this purpose a force-pump is employed which connects with a pipe leading into and near to the bottom of the tun, and previous to entering said tun this pipe is made to pass through a cooler or refrigerator, so that by starting the force-pump a current of cold air is made to pass through the fermenting tun, and the liquid contained therein is rapidly cooled. After the fermentation of the liquid is finished, steam is let into the fermenting tun through a pipe provided for this purpose in such a manner that the low wines are distilled off in an economical and expeditious manner.

A represents a tun, which is charged with the hot saccharine liquid from the mash tun through a suitable pipe which connects the two tuns. When the tun A is charged to the proper height, the connecting pipe is shut off and the air-cock *n* is opened, and by starting the air-pump or fan-blower B, a current of air is forced through the pipe *a* to the bottom of the fermenting tun. During that time the man-hole *b* is left open, so that the air admitted through the pipe *a* passes through the body of the liquid and escapes through said man-hole. The pipe *a*, before it enters the fermenting tun, passes into the refrigerator C, where it forms a coil, so that the current of air while passing through said refrigerator is cooled down to a low temperature, and its cooling effect is materially increased. After the liquid to be fermented is cooled enough to set, the force-pump or fan-blower B is stopped, the cock *n* is shut, the yeast is added to the wort, and the man-hole *b* is closed tight. The stop-cock *h* is now opened and the exhaust-pump D is started, and by its action a vacuum is kept up in the tun until the fermentation is finished. The connection between the exhaust-pump and fermenting tun is effected by means of pipes, *f g*, and an intermediate receiver, E. The pipe *g*, which leads from the fermenting tun to the receiver, passes through the refrigerator C, where it forms a coil, so that all the spirit given off during the process is condensed and collected in the receiver, and at the same time the process of exhausting the air can be continued without interruption. The exhaust-pump D may be constructed in any suitable manner capable of producing the desired effect. After the fermentation of the liquid in the tun A is finished, the cock *j* may be opened, and steam from a suitable generator let into the tun, and thereby the low wines are distilled off with or without a vacuum. The principal advantages derived from this arrangement are as follows:

1. The wort in the fermenting tun is rapidly cooled down to the temperature of the atmosphere or below it by the current of air and the air refrigerator, and consequently the wort is not exposed to the acetifying temperature between 120° and 90°, and the bad effect of such exposure is avoided or at least reduced to a minimum.

2. The atmospheric air is withdrawn, and consequently all acetification during the fermenting process is avoided and an attenuation of several degrees in addition to the usual point is effected. The attenuation in fact can always be carried on below water on the Baumé scale with a corresponding increase in the yield of alcohol.

3. The apparatus serves also for distillation, but is especially applicable to the manufacture of good beer or ale.

We do not claim as our invention to distill *in vacuo*, but what we claim as new, and desire to secure by Letters Patent, is—

1. Effecting the fermentation of saccharine solutions or liquids *in vacuo*.

2. The arrangement of the force-pump or fan-blower, in combination with a suitable refrigerator and with the fermenting tun, for the purpose of cooling the wort, as set forth.

3. The arrangement of a steam pipe, in combination with the tun A, refrigerator or condenser C, and receiver D, substantially as and for the purposes described.

The above specification signed by us this second day of February, 1867.

A. H. TAIT,
JOSEPH W. AVIS.

Witnesses:
  D. B. CHILDS,
  GEO. F. SOUTHERN.